(12) United States Patent
Umemura et al.

(10) Patent No.: US 12,516,767 B2
(45) Date of Patent: Jan. 6, 2026

(54) THERMAL INSULATION STRUCTURE AND STRUCTURE

(71) Applicants: Japan Aerospace Exploration Agency, Chofu (JP); ORBITAL ENGINEERING INC., Yokohama (JP)

(72) Inventors: Yutaka Umemura, Chofu (JP); Takeshi Miyakita, Chofu (JP); Masanori Saitoh, Yokohama (JP); Yuka Terui, Yokohama (JP)

(73) Assignees: Japan Aerospace Exploration Agency (JP); ORBITAL ENGINEERING INC. (JP)

( * ) Notice: Subject to any disclaimer, the term of this patent is extended or adjusted under 35 U.S.C. 154(b) by 201 days.

(21) Appl. No.: 18/552,160

(22) PCT Filed: Mar. 31, 2021

(86) PCT No.: PCT/JP2021/013988
§ 371 (c)(1),
(2) Date: Sep. 22, 2023

(87) PCT Pub. No.: WO2022/208794
PCT Pub. Date: Oct. 6, 2022

(65) Prior Publication Data
US 2024/0183482 A1    Jun. 6, 2024

(51) Int. Cl.
*F16L 59/13*    (2006.01)
*F16L 59/08*    (2006.01)

(52) U.S. Cl.
CPC .............. *F16L 59/13* (2013.01); *F16L 59/08* (2013.01)

(58) Field of Classification Search
CPC ........ F16L 59/028–59/029; F16L 59/12–59/13
See application file for complete search history.

(56) References Cited

U.S. PATENT DOCUMENTS

| 1,412,970 A | 4/1922 | Salfisberg. |
| 8,234,835 B2 | 8/2012 | Dye et al. |

(Continued)

FOREIGN PATENT DOCUMENTS

| JP | 3005526 U | 1/1995 |
| JP | 2007-255610 A | 10/2007 |

(Continued)

OTHER PUBLICATIONS

Office Action dated Oct. 1, 2024 issued in corresponding Japanese Patent Application No. 2023-517004 with English translation.

(Continued)

*Primary Examiner* — Prashant J Khatri
(74) *Attorney, Agent, or Firm* — OSTROLENK FABER

(57) ABSTRACT

A thermal insulation structure (100) including: a thermal insulation film (200); and a plurality of support members (300) that supports the thermal insulation film (200), in which the thermal insulation film (200) is supported by the support member in a state where tension is applied in an in-plane direction of the thermal insulation film (200), the support member (300) includes a first portion (310) and a second portion (320) that are separated from each other, and one or more third portion (330) that connects the first portion (310) and the second portion (320), and a length of the third portion (330) in an extending direction of the third portion (330) is longer than a distance between the first portion (310) and the second portion (320), the first portion (310) and the second portion (320) are disposed along a direction intersecting a surface of the thermal insulation film (200), and the support member (300) is elastically deformable in the direction intersecting a surface of the thermal insulation film (200), and a structure including this thermal insulation structure (100) are provided.

9 Claims, 8 Drawing Sheets

(56) References Cited

U.S. PATENT DOCUMENTS

2012/0175467 A1    7/2012  Dye et al.
2012/0305717 A1   12/2012  Dye et al. .................. 248/176.1
2017/0057391 A1    3/2017  Masanek, Jr. et al.
2017/0073090 A1    3/2017  Li et al.

FOREIGN PATENT DOCUMENTS

JP         2017-075663 A    4/2017
JP         2019-015385 A    1/2019
JP         2019-094016 A    6/2019
TW            201247292 A   12/2012
WO     WO 2011/049096 A1    4/2011

OTHER PUBLICATIONS

Extended European Search Report Jan. 24, 2025, issued in corresponding European Patent Application No. 21939334.5.
Extended European Search Report Dec. 6, 2024 issued in corresponding European Patent Application No. 21934959.4.
International Search Report mailed Jun. 22, 2021 in corresponding PCT International Application No. PCT/JP2021/013988.
International Search Report mailed Jul. 13, 2021 in corresponding PCT International Application No. PCT/JP2021/017211.

THERMAL INSULATION STRUCTURE AND STRUCTURE

CROSS-REFERENCE TO RELATED APPLICATIONS

The present application is a 35 U.S.C. §§ 371 national stage application of International Application No. PCT/JP2021/013988 filed Mar. 31, 2021, the contents of which are incorporated herein by reference.

TECHNICAL FIELD

The present invention relates to a thermal insulation structure and a structure including the thermal insulation structure.

BACKGROUND ART

Since a propellant tank for storing a cryogenic fluid such as a national flagship launch system is required to be lightweight, a foam thermal insulation material is used as a thermal insulation material surrounding the propellant tank. However, the foam thermal insulation material has a low thermal insulation performance, and has a problem in that an evaporation rate of a cryogenic propellant such as liquid hydrogen cannot be suppressed. On the other hand, a cryogenic storage tank on the ground in which the evaporation rate is suppressed has a structure in which multilayer insulation (MLI) is provided in a vacuum double container.

In the conventional MLI, thermal insulation performance is secured by stacking a plurality of thermal insulation films in layers to lessen heat transfer due to radiation, and reducing a contact portion between the thermal insulation films with a nonwoven fabric or a mesh to reduce heat transfer due to heat conduction. For example, in the technique of Patent Document 1, a thick thermal insulation film is adopted to maintain the structure in order to maintain the interval between the thermal insulation films. In addition, Patent Document 2 discloses an MLI in which heat conduction is reduced by installing a spacer instead of a nonwoven fabric or a mesh.

Patent Document 3 discloses a technique related to a lightweight thermal insulation material for cryogenic storage intended for use in space. In the technique of Patent Document 3, the MLI is kept in a vacuum state even in the atmosphere by covering the thermal insulation material with a vacuum pack. In this technique, when moving to a vacuum environment such as in orbit, external pressure such as atmospheric pressure disappears, and a spring mechanism installed in the MLI expands to reduce heat conduction, by which thermal insulation performance is further improved.

CITATION LIST

Patent Document

[Patent Document 1]
United States Patent Publication No. 2017/0073090
[Patent Document 2]
U.S. Pat. No. 8,234,835
[Patent Document 3]
Japanese Unexamined Patent First Publication No. 2019-094016

SUMMARY OF INVENTION

Problem to be Solved by Invention

However, in the MLI using a nonwoven fabric or a mesh as disclosed in Patent Document 1 or the MLI using a spacer as disclosed in Patent Document 2, there is a problem in that the contact state of the thermal insulation film changes according to an error at the time of construction, an acceleration environment, or an operation situation of the propellant tank, and the thermal insulation performance cannot be managed. In a case where the thermal insulation performance is low, it is conceivable to increase the total number of thermal insulation films (the number of layers) of MLI as a countermeasure, but when the total number of thermal insulation films is increased, MLI becomes thicker by an amount corresponding to the total number of thermal insulation films, by which a force to press the layers is generated in the bent portion due to a difference between the inside and the outside of the layer, and the thermal insulation performance is deteriorated. Furthermore, the possibility of contact between the thermal insulation films increases due to the increased weight load of the thermal insulation films. Therefore, increasing the total number of MLIs is not a direct countermeasure against performance deterioration due to contact between the thermal insulation films particularly in an environment receiving acceleration. In addition, the structure as disclosed in Patent Document 3 is a mechanism that partially breaks a component under atmospheric pressure, and focuses on thermal insulation performance when a pressurized environment is shifted to a vacuum environment.

In view of the above circumstances, an object of the present invention is to provide a lightweight thermal insulation structure having high thermal insulation performance, and a structure including the thermal insulation structure.

Means for Solving Problem

When the MLI is used as a thermal insulation material of a cryogenic propellant tank of a space transportation vehicle, a load environment changes due to its own weight due to acceleration such as engine thrust, or due to expansion or contraction of the tank due to pressurization or a change in surface temperature. At these times, the present inventors have focused on the fact that since the interval between the thermal insulation films held by a nonwoven fabric, a mesh, or a spacer is narrowed, contact occurs between the thermal insulation films, and heat transfer due to heat conduction increases.

As a result, the present inventors have found that it is possible to realize a lightweight thermal insulation structure having high thermal insulation performance by supporting the thermal insulation film by an elastically deformable support member in a state where tension is applied to the thermal insulation film forming the MLI. The present invention has been made based on such findings, and the gist is as follows.

(1) A thermal insulation structure according to one aspect of the present invention includes:
a thermal insulation film; and
a plurality of support members that supports the thermal insulation film, in which the thermal insulation film is supported by the support member in a state where tension is applied in an in-plane direction of the thermal insulation film, the support member includes a first portion and a second portion that are separated from each other, and one or more third portion that connects the first portion and the second portion, and a length of the third portion in an extending direction of the third portion is longer than a distance between the first portion and the second portion, the first portion and the second portion are disposed along a direction intersecting a surface of the thermal insulation film, and the support member is elastically deformable in the direction intersecting the surface of the thermal insulation film.

(2) In the thermal insulation structure according to (1), at least a part of the thermal insulation film may be bent or the thermal insulation film may be provided with a cut portion by which the thermal insulation film is capable of being extended between the support members.

(3) In the thermal insulation structure according to (1) or (2), a subfilm laminated on the thermal insulation film may be further provided, and the subfilm may press the thermal insulation film in the direction intersecting the surface of the thermal insulation film.

(4) In the thermal insulation structure according to any one of (1) to (3), the thermal insulation film may have a hole portion, a convex portion may be provided in the first portion of the support member, and the thermal insulation film may be supported in a state where the convex portion is inserted into the hole portion.

(5) In the thermal insulation structure according to any one of (1) to (4), the thermal insulation film may be laminated with the support member interposed between.

(6) In the thermal insulation structure according to any one of (1) to (5), the support member may be made of a resin material.

(7) In the thermal insulation structure according to any one of (1) to (6), the second portion of the support member may be provided with a protruding portion facing the first portion.

(8) A structure according to one aspect of the present invention includes: a thermal insulation structure according to any one of (1) to (7); and a base body.

Advantageous Effects of Invention

According to the present invention, it is possible to provide a lightweight thermal insulation structure having high thermal insulation performance, and a structure including the thermal insulation structure.

BRIEF DESCRIPTION OF DRAWINGS

FIG. 10(B) is a plan view of a state in which a tensile force is applied to the thermal insulation film of FIG. 10(A).

DESCRIPTION OF EMBODIMENTS

Hereinafter, preferred embodiments of the present invention will be described in detail. However, the present invention is not limited only to the configuration disclosed in the present embodiments, and various modifications can be made without departing from the gist of the present invention. In the following description, specific numerical values and materials may be exemplified, but other numerical values and materials may be applied as long as the effect of the present invention can be obtained. In addition, components of the following embodiments can be combined with each other. In addition, the numerical limit range in the following embodiments includes a lower limit value and an upper limit value. A numerical value indicated as "more than" or "less than" is not included in the numerical range.

Figure 1:
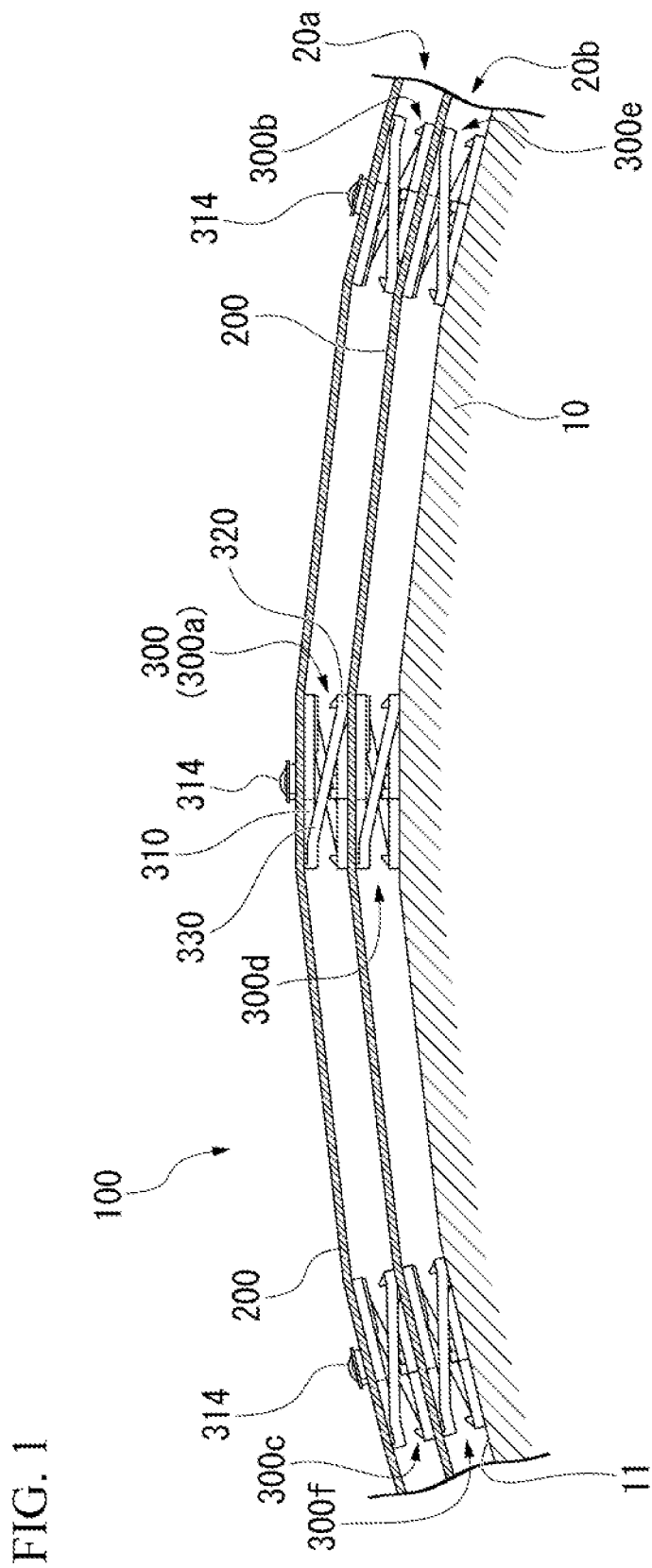
FIG. 1 is a view explaining a thermal insulation structure according to an embodiment of the present invention, and is a schematic cross-sectional view of the thermal insulation structure viewed in a direction parallel to a surface of a thermal insulation film forming the thermal insulation structure.

FIG. 1 is a schematic cross-sectional view of a thermal insulation structure 100 according to the present embodiment viewed in a direction parallel to a surface of a thermal insulation film 200 forming the thermal insulation structure 100. As illustrated in FIG. 1, the thermal insulation structure 100 according to the present embodiment includes the thermal insulation film 200 and a plurality of support members 300 (300a to 300f) that supports the thermal insulation film 200. In the example of FIG. 1, the thermal insulation structure 100 is provided on a surface 11 of a base body 10 via the support members 300 (300d to 300f).

[Thermal Insulation Film]

The thermal insulation film 200 is supported by the support member 300 in a state where tension is applied in an in-plane direction of the thermal insulation film 200.

The thermal insulation film 200 is a low-emissivity film capable of suppressing heat transfer due to radiation. The thermal insulation film 200 is not particularly limited, but is formed by depositing a metal such as aluminum, gold, germanium, or conductive indium tin oxide (ITO) on a resin film such as polyimide or polyester. The thermal insulation film 200 is not limited to this, and can be made of any other suitable material as long as it can withstand the tension applied to the thermal insulation film 200. The thickness of the thermal insulation film 200 is preferably 6 μm or more, and more preferably 12 μm or more from the viewpoint of preventing damage to the thermal insulation film 200 such as elongation and breakage due to application of tension. In addition, the thickness of the thermal insulation film 200 is preferably 200 μm or less, and more preferably 25 μm or less, from the viewpoint of realizing a lightweight structure and suppressing the weight of the thermal insulation film 200. The thickness of the thermal insulation film 200 is an average value (arithmetic average value) of thicknesses measured at four arbitrary points by a dial gauge.

The thermal insulation film 200 is laminated with the support member 300 to be described later interposed between. In the example of FIG. 1, a form in which two thermal insulation film layers 20a and 20b are formed by two thermal insulation films 200 is exemplified, but the thermal insulation film layer forming the thermal insulation structure 100 may be one layer. In addition, three, four, five, or six or more thermal insulation film layers may be laminated. The plurality of thermal insulation films 200 may form one thermal insulation film layer. Here, for example, in a case where there are two thermal insulation film layers, there are two or more thermal insulation films 200 laminated with the support member 300 interposed between.

Figure 2:
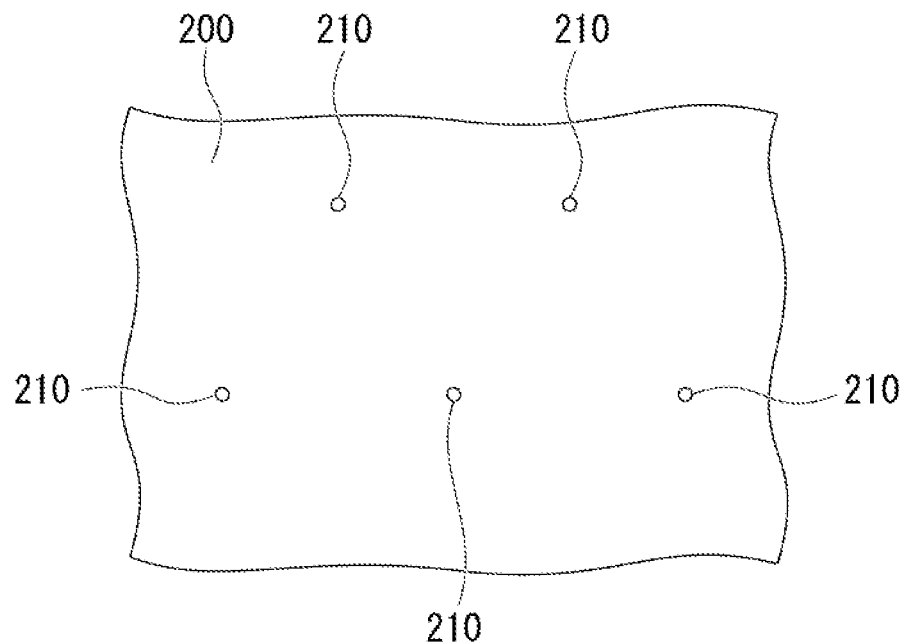
FIG. 2 is a view explaining a thermal insulation film according to an embodiment of the present invention, and is a schematic plan view of the thermal insulation film viewed from a direction orthogonal to a surface of the thermal insulation film.

FIG. 2 is a plan view of the thermal insulation film 200 as viewed from a direction orthogonal to a surface of the thermal insulation film 200. The thermal insulation film 200 has a hole portion 210. A convex portion 314 of the support member 300 to be described later is inserted into the hole portion 210. The size of the hole portion 210 may be any size as long as the convex portion 314 of the support member 300 can be inserted therethrough, and may be any size as long as light does not leak from the hole portion 210. The shape of the hole portion 210 is not particularly limited, and is preferably a circular shape, an elliptical shape, and the like in which a local force is not applied to the thermal insulation film 200.

Figure 3:
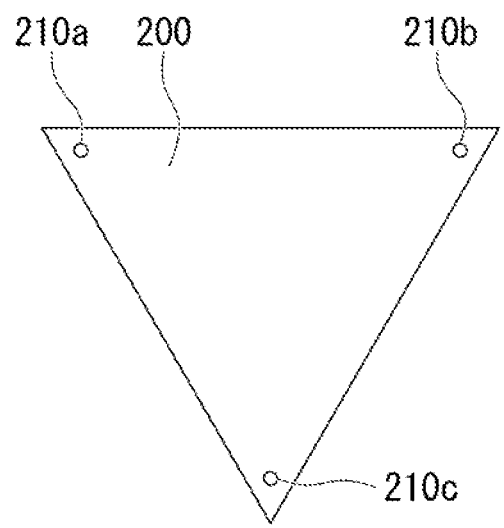
FIG. 3 is a view explaining an example of a shape of the thermal insulation film according to an embodiment of the present invention, and is a schematic plan view of the thermal insulation film viewed from a direction orthogonal to a surface of the thermal insulation film.
Figure 4:
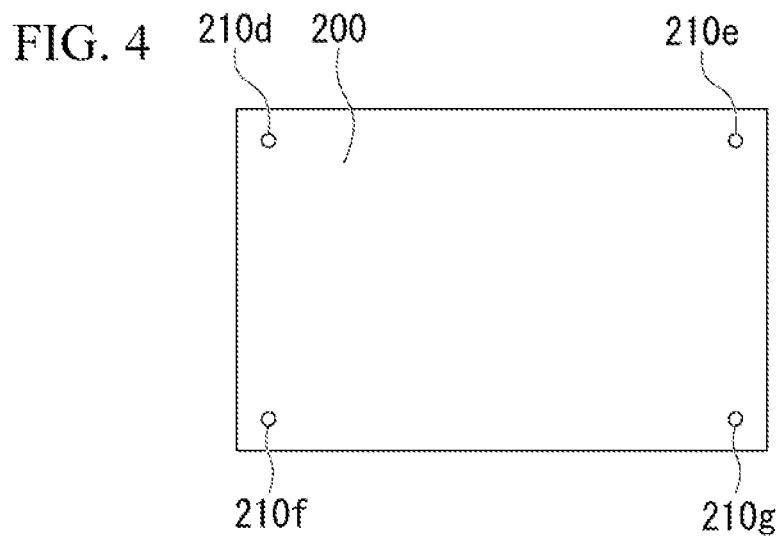
FIG. 4 is a view explaining an example of a shape of the thermal insulation film according to an embodiment of the present invention, and is a schematic plan view of the thermal insulation film viewed from a direction orthogonal to a surface of the thermal insulation film.

The thermal insulation film 200 may have, for example, a triangular shape as illustrated in FIG. 3. In addition, the thermal insulation film 200 having a rectangular shape as illustrated in FIG. 4 may be employed. In the thermal insulation film 200 illustrated in FIG. 3 or FIG. 4, the hole portions 210 (210a to 210g) are provided in the vicinity of vertexes of the thermal insulation films 200, but the hole portions 210 may be provided not only at these positions but also at any position in the thermal insulation film 200. For example, the plurality of hole portions 210 may be provided along an edge of the thermal insulation film 200 illustrated in FIG. 3 or FIG. 4, and the hole portion 210 may be provided in a central portion of the thermal insulation film 200. Note that the thermal insulation film 200 may be referred to as a radiation film.

[Support Member]

Next, the support member 300 will be described. As illustrated in FIG. 1, the support member 300 includes a first portion 310, a second portion 320, and one or more third portion 330. The first portion 310 and the second portion 320 are separated from each other, and the third portion 330 connects the first portion 310 and the second portion 320. As illustrated in FIG. 1, the first portion 310 and the second portion 320 are disposed along a direction intersecting a surface of the thermal insulation film 200.

Figure 5:
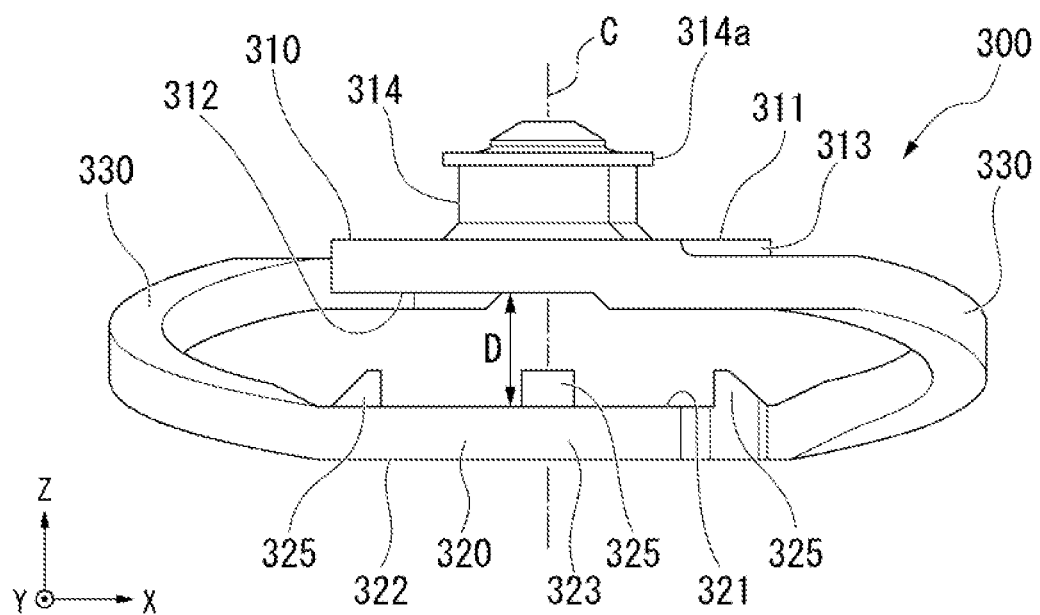
FIG. 5 is a schematic side view of a support member according to an embodiment of the present invention as viewed in a direction (Y-axis direction) orthogonal to an axis of the support member.
Figure 6:
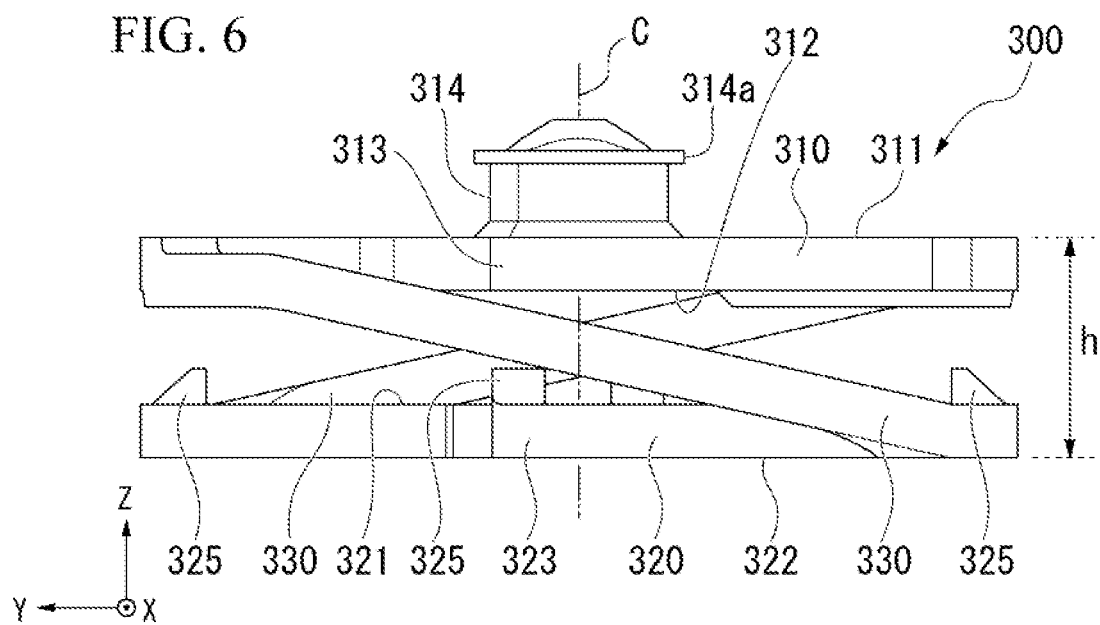
FIG. 6 is a schematic side view of the support member according to an embodiment of the present invention as viewed in a direction (X-axis direction) orthogonal to the axis of the support member.
Figure 7:
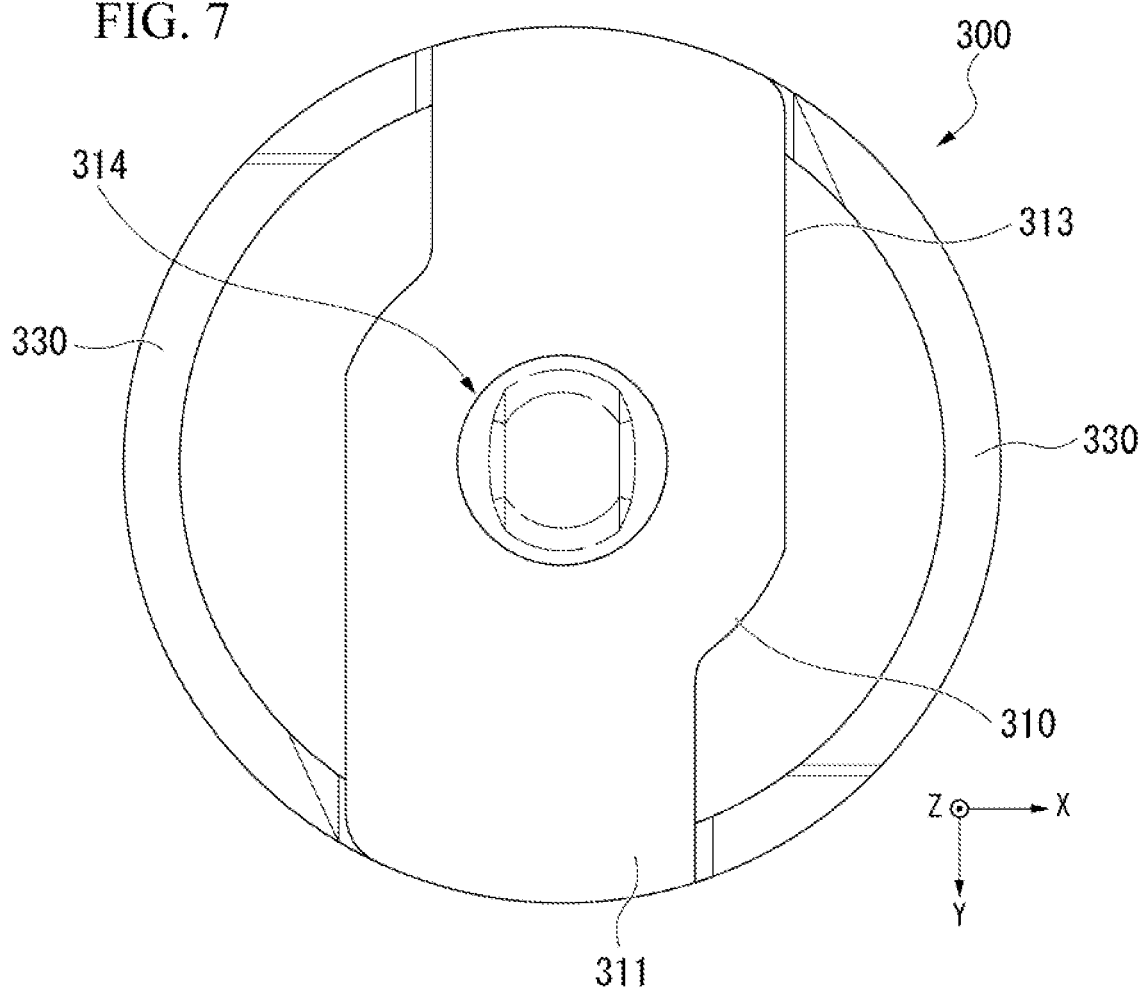
FIG. 7 is a schematic plan view of the support member according to an embodiment of the present invention as viewed in a direction (Z-axis direction) parallel to the axis of the support member.

FIG. 5 is a schematic side view of the support member 300 as viewed in a direction (Y-axis direction) orthogonal to an axis c of the support member. Here, the axis c of the support member 300 means a line passing through the center of the support member 300 and orthogonal to an upper surface 311 of the first portion 310 in a case where the support member 300 is viewed from the side of the first portion 310. FIG. 6 is a schematic side view of the support member 300 as viewed in a direction (X-axis direction) orthogonal to the axis c of the support member. FIG. 7 is a schematic side view of the support member 300 as viewed in a direction (Z-axis direction) parallel to the axis c of the support member. The X-axis, the Y-axis, and the Z-axis in FIGS. 5 to 7 are orthogonal to each other. The Z-axis is parallel to the axis c of the support member 300.

The first portion 310 has the upper surface 311, a lower surface 312 provided on the opposite side of the upper surface 311, and a side portion 313 connecting the upper surface 311 and the lower surface 312. The upper surface 311 is a surface in contact with the thermal insulation film 200 when the thermal insulation structure 100 is formed. The lower surface 312 faces an upper surface 321 of the second portion 320 to be described later.

The convex portion 314 is provided on the upper surface 311 of the first portion 310. The convex portion 314 is inserted into hole portion 210 of the thermal insulation film 200. In addition, the convex portion 314 may be engaged with a concave portion (not illustrated) provided in the second portion 320 to be described later.

The second portion 320 has an upper surface 321, a lower surface 322 provided on the opposite side of the upper surface 321, and a side portion 323 connecting the upper surface 321 and the lower surface 322. The lower surface 322 is a surface in contact with the thermal insulation film 200 when the thermal insulation structure 100 is formed. The upper surface 321 faces the lower surface 312 of the first portion 310.

The second portion 320 may be provided with a concave portion (not illustrated) that engages with the convex portion 314 provided on the upper surface 311 of the first portion 310. Thus, the support members 300 can be coupled to each other in the direction along the axis c of the support member 300. The convex portion 314 may be provided with a protruding portion 314a protruding in the outer diameter direction of the convex portion 314. In a case where the concave portion provided in the second portion 320 penetrates from the upper surface 321 toward the lower surface 322 of the second portion 320, the protruding portion 314a may be configured to be in contact with the upper surface 321 of the second portion 320 of the support member 300 to be coupled in a state where the convex portion 314 is inserted into the concave portion. In addition, the concave portion provided in the second portion 320 may be provided with a recess portion corresponding to the protruding portion 314a, and the protruding portion 314a and the recess portion may be configured to be engaged with each other.

The third portion 330 connects the first portion 310 and the second portion 320. In the example of FIG. 5, one end portion of the third portion 330 is connected to the side portion 313 of the first portion 310, and the other end portion of the third portion 330 is connected to the side portion 323 of the second portion 320.

In the support member 300, the length of the third portion 330 in the extending direction thereof is longer than the distance between the first portion 310 and the second portion 320. Here, the distance between the first portion 310 and the second portion 320 is a distance D between the lower surface 312 of the first portion 310 and the upper surface 321 of the second portion 320 in a direction parallel to the axis c as illustrated in FIG. 5. The distance D and the length of the third portion 330 in the extending direction are lengths in a state where no force is applied to the support member 300 (also referred to as an initial state). The extending direction of the third portion 330 means a direction in which the third portion 330 is continuous from one end side to the other end side of the third portion 330. The length of the third portion 330 in the extending direction is a length connecting centers of cross sections perpendicular to the extending direction at respective points in the extending direction. The shape of the cross section of the third portion 330 perpendicular to the extending direction at each point in the extending direction is not particularly limited, and may be circular, elliptical, or rectangular. The cross section of the third portion 330 perpendicular to the extending direction at each point in the extending direction is preferably smaller than the outer diameter of the support member 300. In the support member 300, since the third portion 330 connecting the first portion 310 and the second portion 320 is formed long in the extending direction, the thermal resistance of the support member 300 as a whole increases.

In the example of FIG. 5 and the like, the third portions 330 are paired and have a spiral shape. With such a shape, stability as the support member 300 is secured, and the support member 300 can be smoothly elastically deformed in a direction parallel to the axis c. In addition, when the support member 300 is viewed from a direction parallel to the axis c, the third portion 330 preferably does not protrude in the radial direction of the support member 300. For example, in the example of FIG. 7, when the support member 300 is viewed from the direction parallel to the axis c, the outer diameter of the third portion 330 forms the outer diameter of the entire support member 300. With such a configuration, contact between the thermal insulation film 200 and the support member 300 when the thermal insulation film 200 is deflected can be suppressed, by which deterioration of thermal insulation performance as the thermal insulation structure 100 can be suppressed. However, the third portion 330 is not limited to this shape, and may have a linear shape or a shape obtained by combining a plurality of linear shapes and curved shapes. In addition, the end portion of the third portion 330 may be connected to the lower surface 312 of the first portion 310 and the upper surface 321 of the second portion 320.

The support member 300 is elastically deformable in a direction intersecting a surface of the thermal insulation film 200. Thus, the thermal insulation film 200 can be supported by the support member 300 in a state where tension is applied in an in-plane direction of the thermal insulation film 200. More specifically, since the support member 300 is elastically deformable in a direction parallel to axis c, the support member 300 is elastically deformable in a direction intersecting a surface of the thermal insulation film 200 when the thermal insulation structure 100 is formed. Since the support member 300 has a structure in which the first portion 310 and the second portion 320 are connected by the third portion 330 as described above, in a case where a compressive force in a direction parallel to the axis c is received, a part or the whole of the third portion 330 is deformed to reduce the interval between the first portion 310 and the second portion 320, and the support member 300 as a whole contracts in a direction parallel to the axis c. In addition, in a case where a tensile force is applied in a direction parallel to the axis c, a part or the whole of the third portion 330 is deformed, by which the interval between the first portion 310 and the second portion 320 increases, and the support member 300 as a whole extends in a direction parallel to the axis c. In addition, when these compressive forces or tensile forces are no longer applied, the restoring force of the third portion 330 returns the interval between the first portion 310 and the second portion 320 to the initial state.

The height of the support member 300 in the direction parallel to the axis c is preferably 1 mm or more because it is necessary and sufficient to prevent contact between the thermal insulation films 200. In addition, the height is preferably 5 mm or less since this allows the support member 300 to easily maintain a shape parallel to the axis c. In addition, an outer diameter of the support member 300 on a plane orthogonal to axis c is preferably 3 mm to 20 mm in order to ensure a contact surface sufficient for the thermal insulation film 200 and the support member 300 to transmit a compressive force or a tensile force. The height of the support member 300 means a distance h between the upper surface 311 of the first portion 310 and the lower surface 322 of the second portion 320 in a direction parallel to the axis c as illustrated in FIG. 6.

The support member 300 is preferably made of a resin material such as polyether ether ketone (PEEK), polycarbonate (PC), polyethylene terephthalate (PET), or polyimide (PI). For example, the support member 300 is manufactured by injection molding raw materials of these resin materials. The configuration of the support member 300 is not limited to this, and may be made of any other appropriate material. Polyether ether ketone is the most preferable material as the support member 300 from the viewpoints of high heat resistance, low temperature embrittlement resistance, a small amount of outgas in a vacuum, and ultraviolet resistance required in a thermal insulation material for space transportation vehicles.

Figure 8:
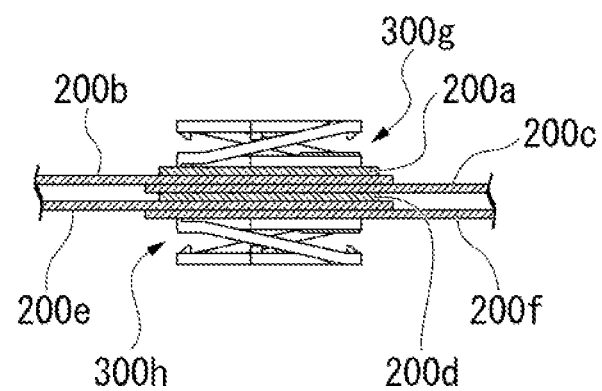
FIG. 8 is a view explaining a state in which a plurality of thermal insulation films is stacked, and is a schematic cross-sectional view of the thermal insulation structure viewed in a direction parallel to a surface of the thermal insulation film forming the thermal insulation structure.

As illustrated in FIG. 1, the support members 300 may be coupled in a direction in which the thermal insulation films 200 are laminated. One or a plurality of the thermal insulation films 200 is sandwiched between the two support members 300 coupled to each other. For example, in a case where one thermal insulation film layer is formed by the plurality of thermal insulation films 200, as illustrated in FIG. 8, the thermal insulation films 200a to 200f may be stacked between the coupled support members 300g and 300h.

In order to efficiently transmit the force applied to the support member 300 to the base body 10, the support member 300 is preferably attached to the base body 10 such that a perpendicular line of the surface 11 of the base body 10 at a position where the support member 300 is attached coincides with the axis c of the support member 300. Therefore, in a case where the surface 11 of the base body 10 is a curved surface or a spherical surface, the axis c of the support member 300 is inclined with respect to the axis c of the adjacent support member 300.

In the support member 300, as illustrated in FIG. 5 or FIG. 6, the second portion 320 may be provided with a protruding portion 325 facing the first portion 310. More specifically, the upper surface 321 of the second portion 320 is provided with the protruding portion 325 facing the lower surface 312 of the first portion 310. For example, under a pressurized environment such as on the ground, a strong compressive force acts on the thermal insulation structure 100 by being pressurized to atmospheric pressure, and the support member 300 is compressed and crushed as a whole. By providing the protruding portion 325, the contact area between the first portion 310 and the second portion 320 when compressed and crushed is minimized, the thermal resistance of the support member 300 itself can be increased, and lighter and higher thermal insulation performance than that of a conventional foam thermal insulation material and the like can be obtained. When the thermal insulation structure 100 moves from a pressurized environment to a vacuum environment and no compressive force due to pressurization acts, the elastic deformability of the support member 300 moves the first portion 310 and the second portion 320 in a direction separating from each other, by which the interval between the thermal insulation film layers relatively increases, and higher thermal insulation performance can be obtained.

[Base Body]

The shape of the base body 10 is not particularly limited, but for example, a part of it may be a curved surface or a spherical surface. The base body 10 is, for example, a propellant tank for storing a cryogenic fluid such as a national flagship launch system, a structure such as an artificial satellite, or an inner wall of a vacuum tank on the ground. Since the thermal insulation structure 100 according to the present embodiment has high thermal insulation performance and is lightweight, the thermal insulation structure 100 according to the present embodiment can be preferably applied to these base bodies.

Figure 9:
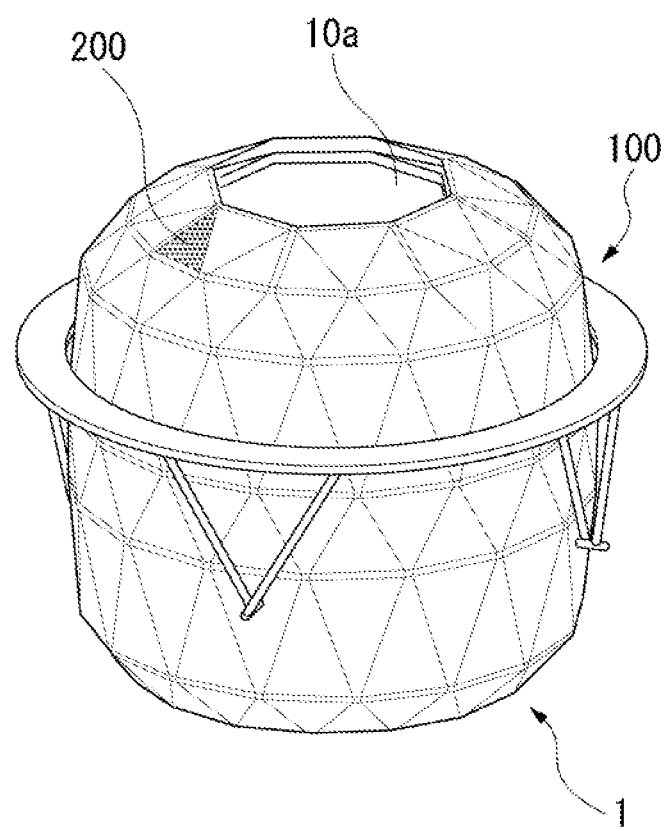
FIG. 9 is a schematic perspective view illustrating an example in which the thermal insulation structure according to an embodiment of the present invention is applied to a propellant tank.

FIG. 9 illustrates an application example of the thermal insulation structure 100 according to the present embodiment. In the example of FIG. 9, the thermal insulation structure 100 is provided around a propellant tank (base body) 10a to form a structure 1. In the example of FIG. 9, a plurality of thermal insulation films forms a thermal insulation film layer (thermal insulation film layer as an outermost layer). In a case where the thermal insulation structure 100 according to the present embodiment is provided on a base body having a shape as illustrated in FIG. 9, each layer of the thermal insulation film layer is formed by the plurality of thermal insulation films 200. Thus, the thermal insulation structure 100 can be formed along the shape of the base body. In the example of FIG. 9, the plurality of thermal insulation films 200 having a triangular shape as illustrated in FIG. 3 is used.

In order to apply tension to the thermal insulation film 200, when the thermal insulation structure 100 is installed on the base body 10, the support member 300 is compressed or stretched in a direction parallel to the axis c. In order to realize such a state, the interval between the hole portions 210 of the thermal insulation film 200 as described above is appropriately designed. For example, in a case where the thermal insulation structure 100 according to the present embodiment is provided at a position where the surface 11 of the base body 10 becomes convex toward the outside of the base body 10, the support member 300 is contracted as compared with the initial state by designing the distance between the adjacent hole portions 210 to be small. When the height of the support member 300 in the direction parallel to the axis c in the initial state is h and the height of the support member 300 in the contracted state is hc, h>hc is satisfied. In this case, tension is applied in the in-plane direction of the thermal insulation film 200 by a restoring force of the support member 300 to return to the initial state. Specifically, assuming that an elastic coefficient in a direction parallel to the axis c of the support member 300 is k, in a state where the support member 300 is contracted, a stress of σc=k (h−hc) is generated in a direction parallel to the axis c of the support member 300 and in which the first portion 310 and the second portion 320 are separated from each other. Since the axis c of the support member 300 is inclined with respect to the axis c of the adjacent support member 300, a component of the stress σc acts in the in-plane direction of the thermal insulation film 200, and tension is applied to the thermal insulation film 200 between the adjacent support members 300.

In addition, in a case where the thermal insulation structure 100 according to the present embodiment is provided at a position where the surface 11 of the base body 10 becomes concave toward the inside of the base body 10, the support member 300 is elongated as compared with the initial state by designing the distance between the adjacent hole portions 210 to be small. When the height of the support member 300 in the initial state is h and the height of the support member 300 in the elongated state is he, h>he is satisfied. In this case, tension is applied in the in-plane direction of the thermal insulation film 200 by the restoring force of the support member 300 to return to the initial state. Specifically, assuming that an elastic coefficient in a direction parallel to the axis c of the support member 300 is k, in a state where the support member 300 is elongated, a stress of σe=k (he−h) is generated in a direction parallel to the axis c of the support member 300 and in which the first portion 310 and the second portion 320 approach each other. Since the axis c of the support member 300 is inclined with respect to the axis c of the adjacent support member 300, a component of the stress σe acts in the in-plane direction of the thermal insulation film 200, and tension is applied to the thermal insulation film 200 between the adjacent support members 300.

Note that the position of the hole portion 210 is designed on condition that the thermal insulation structure 100 and the base body 10 are at room temperature)(25° ° C. under atmospheric pressure. For example, the arrangement of the support member 300 and the length of compression or stretching are appropriately designed such that the interval between the thermal insulation films 200 can be kept in a state of not being in contact with each other, and the arrangement of the thermal insulation film 200 and the hole portions 210 of the thermal insulation film 200 is determined in consideration of the temperature at the time of using each thermal insulation film layer, the temperature difference from room temperature, the deformation due to degassing in a vacuum state, the dimensional change when exposed to high temperature, and the like.

From the above, the thermal insulation structure 100 according to the present embodiment can be preferably used for the base body 10 having a part or the whole formed in a curved surface or a spherical surface. Note that the thermal insulation structure 100 may be installed in a sealed space in a vacuum state.

In the thermal insulation structure 100 according to the present embodiment, since the thermal insulation film 200 is supported by the support member 300 in a state where tension is applied in the in-plane direction of the thermal insulation film 200, deflection of the thermal insulation film 200 is suppressed. Therefore, contact between the laminated thermal insulation films 200 can be suppressed, and thermal insulation performance can be improved. In addition, since the length in the extending direction of the third portion 330 is longer than the distance between the first portion 310 and the second portion 320, the route through which heat is transferred in the support member 300 becomes longer, the heat conduction amount of the support member 300 can be reduced, and the thermal insulation performance of the thermal insulation structure 100 can be improved.

In addition, in the thermal insulation structure 100 according to the present embodiment, since the contact between the laminated thermal insulation films 200 can be suppressed only by the support member 300, a member such as a nonwoven fabric or a mesh is unnecessary, and the mass of the thermal insulation structure 100 can be reduced. In addition, since the support member 300 is elastically deformable in the direction intersecting the surface of the thermal insulation film 200, even in a case where the thermal insulation film 200 having a small thickness is used, an appropriate tension can be applied to the thermal insulation film 200, and the mass of the thermal insulation structure 100 can be reduced.

In a case where the thermal insulation structure 100 according to the above embodiment is applied to a propellant tank of a national flagship launch system, the outer surface has a high temperature due to the influence of sunlight and the like, and the inner surface has a relatively low temperature due to a fluid in the propellant tank. The fluid temperature in the propellant tank changes due to the remaining amount of the propellant and the pressure in the tank. Therefore, the temperature of the propellant tank itself or the thermal insulation structure 100 changes, and thermal distortion corresponding to each temperature difference occurs. In addition, in a case where the pressure in the propellant tank is changed, the tank expands. By further providing the following structure, it is possible to preferably maintain the interval between the laminated thermal insulation films 200 against such a change in temperature environment and a dimensional change of the propellant tank (base body).

In the thermal insulation structure 100 according to the above embodiment, at least a part of the thermal insulation film 200 may be bent or a cut portion may be provided in the thermal insulation film 200 such that the thermal insulation film 200 can be extended between the support members 300.

Figure 10:
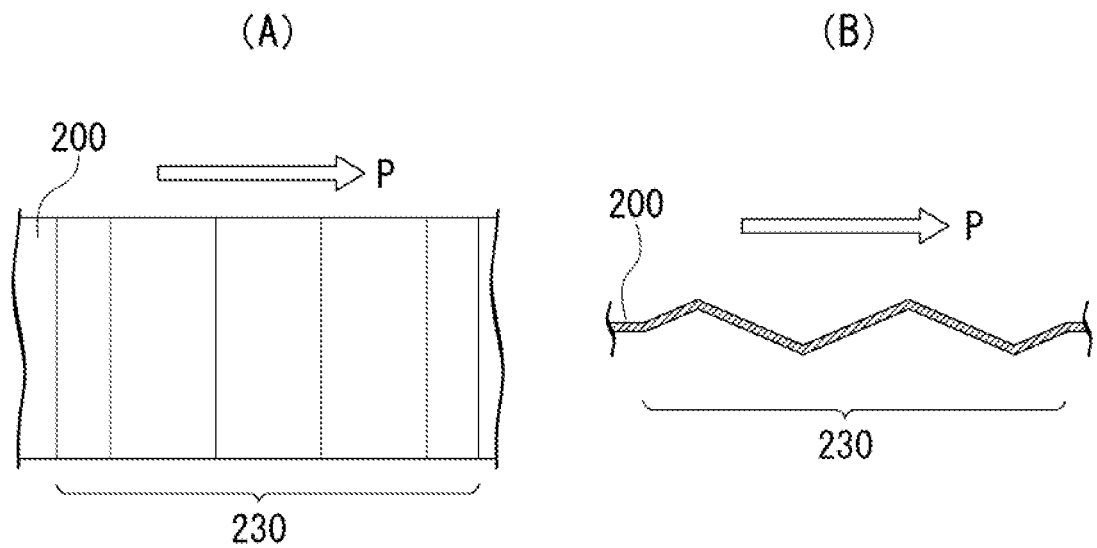
FIG. 10(A) is a view explaining a modification of a thermal insulation film provided with a bent portion, and is a plan view of a part of the thermal insulation film as viewed from a direction intersecting a surface of the thermal insulation film.
FIG. 10(B) is a cross-sectional view of the thermal insulation film of FIG. 10(A) as viewed in an in-plane direction of the thermal insulation film.

The state in which at least a part of the thermal insulation film 200 is bent means that a part of the thermal insulation film 200 is bent in the in-plane direction as illustrated in FIG. 10(A) or 10(B). As described above, a bent range of the thermal insulation film 200 is referred to as a bent portion 230. With such a configuration, in a case where a tensile force acts in the P direction in FIG. 10(A) or FIG. 10(B), even in a case where expansion and contraction of the base body due to temperature change of the base body, expansion and contraction of the thermal insulation film 200 itself due to ambient temperature change, and design tolerance/error are occurred, the expansion and contraction and tolerance/error are absorbed by the bent portion 230 by stretching of the bent portion 230, and it is possible to suppress the occurrence of an excessive load on the support member 300.

Figure 11:
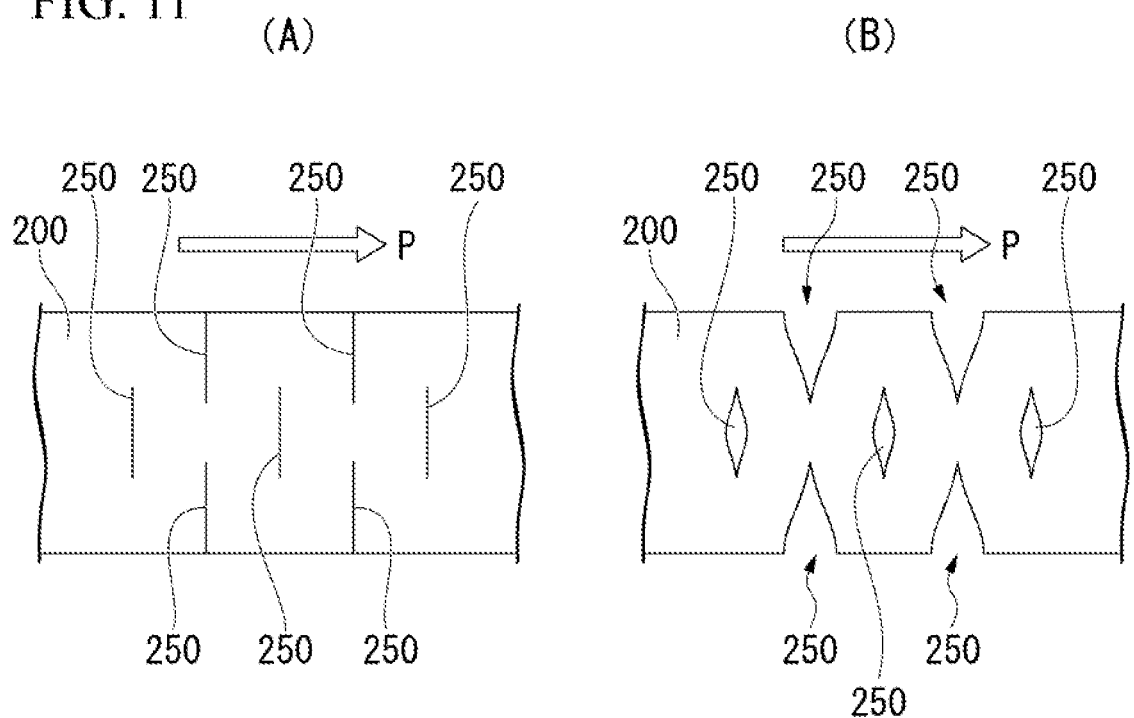
FIG. 11(A) is a view explaining a modification of a thermal insulation film provided with a cut portion, and is a plan view of a part of the thermal insulation film as viewed from a direction intersecting a surface of the thermal insulation film.

In addition, as illustrated in FIG. 11(A), since a cut portion 250 is provided in the thermal insulation film 200, in a case where a tensile force acts in the P direction in FIG. 11(A), even in a case where expansion and contraction of the base body due to temperature change of the base body, expansion and contraction of the thermal insulation film 200 itself due to ambient temperature change, and design tolerance/error are occurred, the expansion and contraction and tolerance/error are absorbed by deformation of the cut portion 250 by expanding of the cut portion 250 as illustrated in FIG. 11(B), and it is possible to suppress the occurrence of an excessive load on the support member 300.

The bent portion 230 or the cut portion 250 is provided between the adjacent support members 300. The number of the bent portions 230 or the cut portions 250 is not particularly limited, but it is more preferable that the bent portions 230 or the cut portions 250 be provided on a line segment connecting the support member 300 and the support member 300. It is not necessary to provide the bent portion 230 or the cut portion 250 in the entire range of the thermal insulation structure 100, and it is preferable to appropriately set the arrangement of the bent portion 230 or the cut portion 250.

Figure 12:
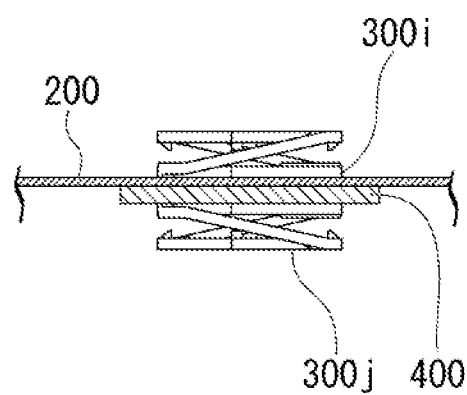
FIG. 12 is a view explaining a state in which a subfilm is further provided in the thermal insulation structure, and is a schematic cross-sectional view of the thermal insulation structure viewed in a direction parallel to a surface of the thermal insulation film forming the thermal insulation structure.

In the thermal insulation structure 100 according to the above embodiment, as illustrated in FIG. 12, it is preferable that a subfilm 400 laminated on the thermal insulation film 200 be further provided. The subfilm 400 is preferably sandwiched between the two support members 300 (300$i$ and 300$j$) coupled together with the thermal insulation film 200 in a state of being stacked on the thermal insulation film 200. The subfilm 400 may be made of the same material as thermal insulation film 200, or may have the same thickness as thermal insulation film 200. Alternatively, the subfilm 400 may be made of a material thicker than the thermal insulation film 200, and the thickness of the subfilm 400 is preferably 6 μm to 100 μm from the viewpoint of imparting strength that does not damage the subfilm 400 even in a case where a bending force or a tensile force is applied to the subfilm 400. The shape of the subfilm 400 is not particularly limited, but may be, for example, a circular shape, an elliptical shape, or a belt shape. The subfilm 400 presses the thermal insulation film 200 in a direction intersecting a surface of the thermal insulation film 200, by which an interval between the laminated thermal insulation films 200 can be appropriately maintained. The end portion of the subfilm 400 may be folded back. Thus, the end portion of the subfilm is reinforced, and for example, even in a case where a thin subfilm 400 equivalent to the thermal insulation film 200 is adopted, strength sufficient for pressing the thermal insulation film 200 can be obtained. In the thermal insulation structure according to the above embodiment, the end portion of the thermal insulation film 200 may be folded back. Thus, a function of pressing the thermal insulation film 200 such as the subfilm 400 can be imparted to the thermal insulation film 200 itself.

In the thermal insulation structure according to the above embodiment, a net spacer or an embossed film may be further provided between the thermal insulation films 200. Since the embossed film is superior in rigidity to a normal flat film, the arrangement interval of the support members 300 can be lengthened, and it is effective for both reducing the influence of contact between the thermal insulation films 200 and preventing contact. To reduce costs, the use of embossed films may be partial.

In the thermal insulation structure according to the above embodiment, a conductor layer may be provided on the surface of the support member 300. Such a conductor layer may be formed by nickel plating or aluminum vapor deposition. Thus, it is possible to reduce a potential difference between the thermal insulation films 200 (between the thermal insulation film layers) to be laminated, and it is possible to satisfy a bonding requirement required for a spacecraft. In addition, the emissivity of the surface of the support member 300 can be reduced, and thermal insulation performance can be further improved by suppressing radiation heat transfer from the surface of the support member 300. In order to reduce the cost, the above conductor layer may be provided only on some of the support members 300.

EXAMPLE

Next, an example of the present invention will be described, but the conditions in the example are examples relating to one condition adopted to confirm the feasibility and effects of the present invention, but the present invention is not limited to this example. The present invention can adopt various conditions as long as the object of the present invention is achieved without departing from the gist of the present invention.

In the present example, the thermal insulation structure described in the above embodiment was attached to a surface of a tank installed in a vacuum container, liquid nitrogen (LN$_2$) was stored in the tank, and a mass flow rate of vapor generated from the inside of the tank was measured to evaluate heat entering from the thermal insulation structure. In the present example, a guard tank that individually removes heat by evaporation was set not to be affected by heat entering through a portion other than the thermal insulation structure such as a pipe. In addition, it was verified in advance that a corresponding evaporation amount could be obtained when a known heat input was applied by a heater installed on the surface of the tank in advance. The outline of the test apparatus is illustrated in FIG. 13.

In this test apparatus, a mechanism for controlling the temperature of the side surface of the thermal insulation structure 1013 was provided, and the thermal insulation performance at three outer layer temperatures of 276K, 300K, and 353K was acquired using the difference in outer layer temperature as a parameter. Note that each configuration of the apparatus in FIG. 13 was as follows.

Data Logger: data logger (measurement recorder)
MFM: Mass Flow Meter (mass flow meter)
IG: Ion Gauge (ionization vacuum gauge)
PiG: Pirani Gauge (Pirani vacuum gauge)
Thermostat circulator: thermostat bath circulation device
Vacuum chamber: vacuum container
Water tank: water container (shroud)
Guard tank: guard tank
Boil-off tank: boil-off tank
Vacuum pump: vacuum exhaust device
RP: rotary pump
TMP: turbo-molecular pump
PC: computer
T.C×24: thermo couple (thermocouple, measured at 24 points)

Figure 13:
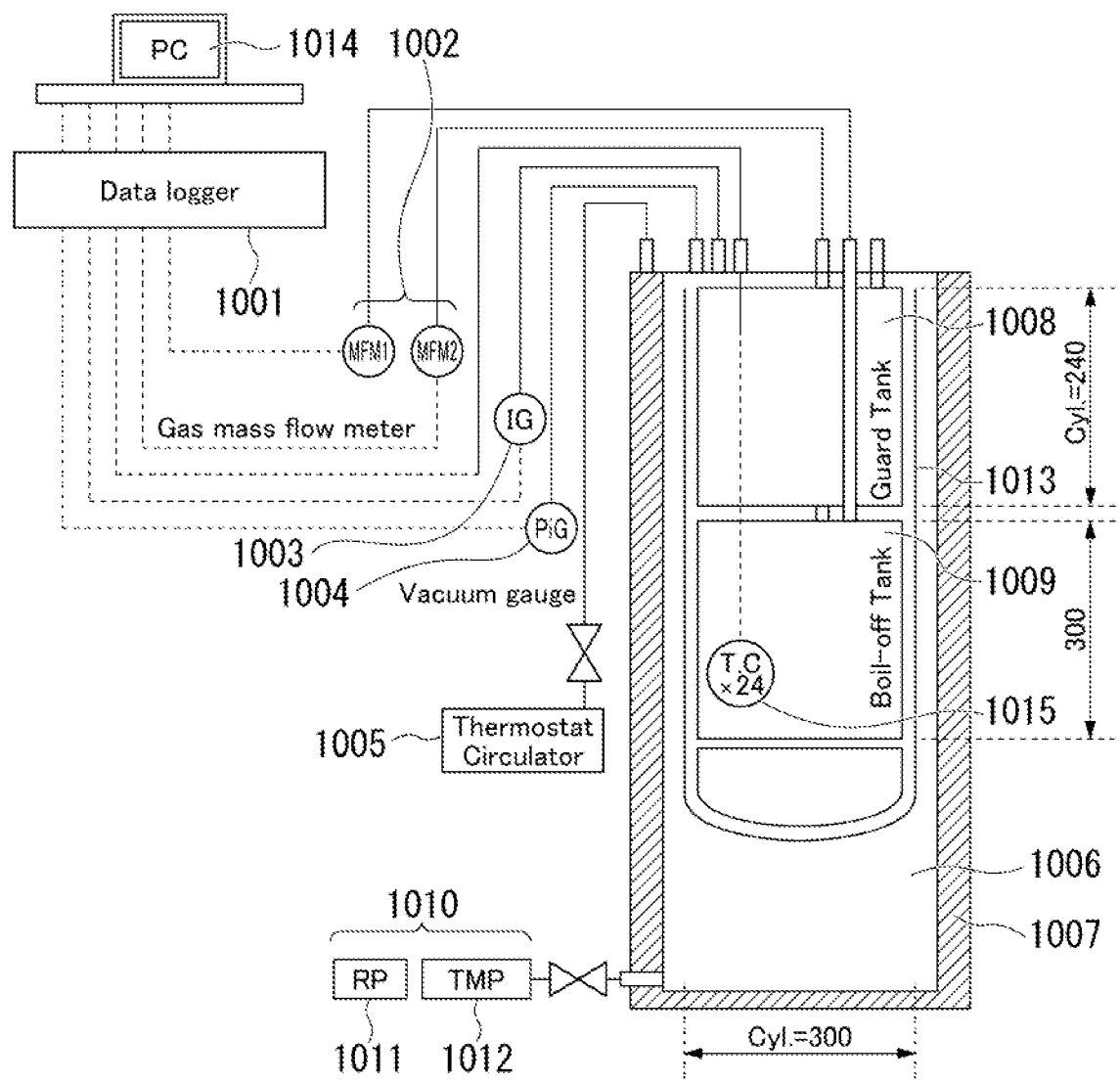
FIG. 13 is a schematic view explaining an outline of a test apparatus according to an example.

Note that, in FIG. 13, "Cyl.=300" means that the boil-off tank and the guard tank had a cylinder (tubular shape) and a diameter of 300 mm, "Cyl. 240" means that the guard tank had a height of 240 mm, and "300" means that the boil-off tank had a height of 300 mm.

Figure 14:
FIG. 14 is a photograph of the test apparatus according to an example.

In addition, FIG. 14 illustrates a state in which the thermal insulation structure according to the present invention was attached to a test tank. Most of the surface of the propellant tank of the spacecraft was a combination of an elliptical sphere and a tube, and FIG. 14 is an example when the thermal insulation structure according to the present invention was attached to the elliptical sphere portion. It is understood from FIG. 14 that the present invention is also applicable to a spherical surface.

Figure 15:
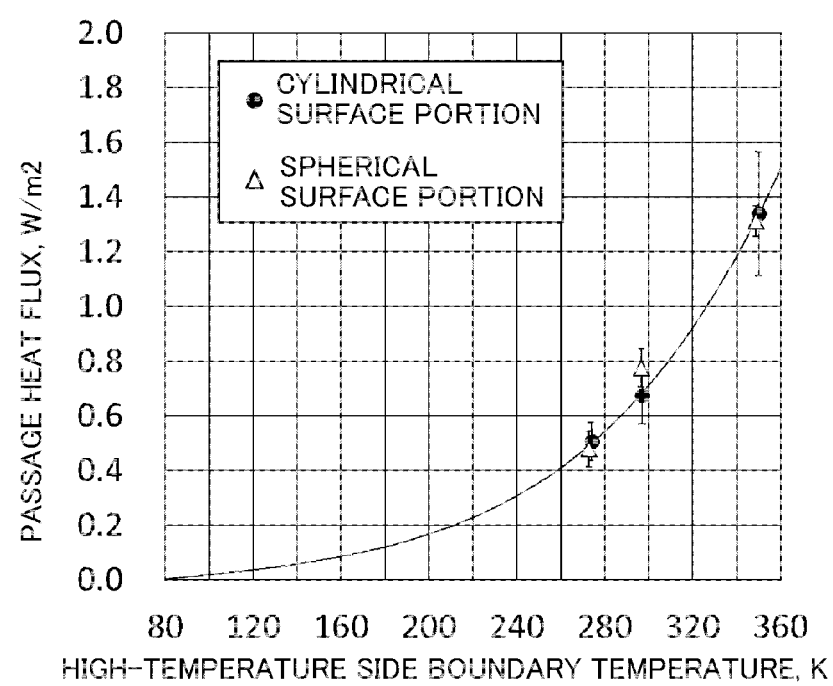
FIG. 15 is a graph explaining a measurement result according to an example.

FIG. 15 illustrates an example of performance when the structure of the thermal insulation structure according to the present invention was adopted and 12 radiation films of aluminum vapor-deposited polyester were stacked as thermal insulation films. The result of FIG. 15 illustrates the heat flux in a case where the low temperature side of the inner layer of the thermal insulation material was the liquid nitrogen temperature (77 K). The heat flux when the thermal insulation structure according to the present invention was applied to the elliptical spherical surface is indicated by a triangular plot (Δ). The triangular plot is in the same range as the result (circle plot (●) and error bar) when the thermal insulation structure was installed in the tubular portion, and it could be seen that the thermal insulation structure according to the present invention can be applied as a thermal insulation material for a propellant tank without being affected by the shape of an elliptical sphere, a tube, and the like. Note that, in the graph of FIG. 15, the vertical axis represents the passage heat flux (W/m$^2$), and the horizontal axis represents the high-temperature side boundary temperature (K).

In addition, Table 1 illustrates the results of comparing the performance of the thermal insulation structure (Example 1) according to the present invention at an outer layer temperature of 300 K with a thermal insulation structure of Comparative Example 1, which was a multilayer thermal insulation material having 20 layers of radiation films, and a thermal insulation structure of Comparative Example 2 including a foam thermal insulation material having a thickness of 25 mm. The thermal insulation structure used in Comparative Example 1 was different from that of Example 1 in that the members that support the radiation films are not elastically deformed. In the thermal insulation structure used in Comparative Example 2, a plurality of foam thermal insulation materials was stacked to form a thermal insulation structure.

TABLE 1

| | | Example 1 | Comparative Example 1 | Comparative Example 2 |
|---|---|---|---|---|
| Thermal insulation material performance | Heat flux (W/m$^2$) | 0.78 | 1.30 | 134 |
| | Area density (kg/m$^2$) | 0.31 | 1.50 | 0.84 |
| When spherical tank is assumed | LN$_2$ evaporation rate (%/day) | 0.13 | 0.21 | 21.7 |
| | LN$_2$ evaporation amount (kg/day) | 4.3 | 7.1 | 731 |

TABLE 1-continued

|  | Example 1 | Comparative Example 1 | Comparative Example 2 |
|---|---|---|---|
| Thermal insulation material mass (kg) | 3.9 | 19 | 11 |

From the results in Table 1, it was found that since the heat flux of Example 1 was smaller than the heat flux of Comparative Example 1 or Comparative Example 2, the thermal insulation material performance as a thermal insulation structure was high, and the evaporation amount could be suppressed.

In addition, Table 1 illustrates the results of calculation of the evaporation rate and evaporation amount of liquid nitrogen and the total mass as the insulation structure when each thermal insulation structure was applied to a spherical tank having a diameter of 2 m. Generally, in order to reduce the heat flux passing through the thermal insulation material, it is necessary to increase the area density of the thermal insulation material. However, since the thermal insulation structure of Example 1 had high thermal insulation performance, the thermal insulation performance could be secured without increasing the area density. Therefore, it can be seen that in a case where the thermal insulation structure of Example 1 was applied to a spherical tank, the evaporation amount of a substance (liquid nitrogen in this example) stored in the tank could be suppressed, and the mass as the thermal insulation structure could also be reduced.

INDUSTRIAL APPLICABILITY

According to the present invention, it is possible to provide a lightweight thermal insulation structure having high thermal insulation performance, and a structure including the thermal insulation structure. Therefore, the industrial value is extremely high.

REFERENCE SIGNS LIST

1 Structure
10 Base body
10a Propellant tank
11 Surface of base body
100, 1013 Thermal insulation structure
200, 200a, 200b, 200c, 200d, 200e, 200f, 200g Thermal insulation film
210 Hole portion
230 Bent portion
250 Cut portion
300, 300a, 300b, 300c, 300d, 300e, 300f, 300g, 300h, 300i, 300j Support member
310 First portion
320 Second portion
330 Third portion
400 Subfilm
1001 Measurement recorder
1002 Mass flow meter
1003 Ionization vacuum gauge
1004 Pirani vacuum gauge
1005 Thermostat bath circulation device
1006 Vacuum container
1007 Water container
1008 Guard tank
1009 Boil-off tank
1010 Vacuum exhaust device
1011 Rotary pump
1012 Turbo-molecular pump
1014 Computer
1015 Thermocouple

The invention claimed is:

1. A thermal insulation structure, comprising:
a thermal insulation film; and
a plurality of support members that supports the thermal insulation film, wherein
the thermal insulation film is supported by the support member in a state where tension is applied in an in-plane direction of the thermal insulation film,
the support member includes a first portion and a second portion that are separated from each other, and one or more third portion that connects the first portion and the second portion, and a length of the third portion in an extending direction of the third portion is longer than a distance between the first portion and the second portion,
the first portion and the second portion are disposed along a direction intersecting a surface of the thermal insulation film,
the support member is elastically deformable in the direction intersecting the surface of the thermal insulation film,
at least a part of the thermal insulation film is bent or the thermal insulation film is provided with a cut portion such that the thermal insulation film is capable of being extended between the support members, and
the thermal insulation structure comprises a pair of the third portions and the third portions having a spiral shape.

2. The thermal insulation structure according to claim 1, wherein
a subfilm laminated on the thermal insulation film is further provided, and the subfilm presses the thermal insulation film in the direction intersecting the surface of the thermal insulation film.

3. The thermal insulation structure according to claim 1, wherein
the thermal insulation film has a hole portion, a convex portion is provided in the first portion of the support member, and the thermal insulation film is supported in a state where the convex portion is inserted into the hole portion.

4. The thermal insulation structure according to claim 1, wherein
when two or more of the thermal insulation films are provided, the thermal insulation films are laminated with the support member interposed between the thermal insulation films.

5. The thermal insulation structure according to claim 1, wherein
the support member is made of a resin material.

6. The thermal insulation structure according to claim 1, wherein
the second portion of the support member is provided with a protruding portion facing the first portion.

7. A structure comprising:
a thermal insulation structure according to claim 1; and
a base body.

8. The thermal insulation structure according to claim 1, wherein
when a line passing through a center of the support member and orthogonal to an upper surface of the first portion is an axis of the support member, when viewed from the direction parallel to the axis of the support member, an outer diameter of the third portion forms an outer diameter of the entire support member.

9. The thermal insulation structure according to claim 1, wherein
one end portion of the third portion is connected to a side portion of the first portion and the other end portion of the third portion is connected to a side portion of the second portion.

* * * * *